(12) United States Patent
Yao et al.

(10) Patent No.: US 10,764,327 B2
(45) Date of Patent: Sep. 1, 2020

(54) E-MAIL ANTI-PHISHING SYSTEM AND METHOD

(71) Applicant: CHINA INTERNET NETWORK INFORMATION CENTER, Beijing (CN)

(72) Inventors: Jiankang Yao, Beijing (CN); Ning Kong, Beijing (CN); Xiaodong Li, Beijing (CN)

(73) Assignee: CHINA INTERNET NETWORK INFORMATION CENTER, Beijing (CN)

( * ) Notice: Subject to any disclaimer, the term of this patent is extended or adjusted under 35 U.S.C. 154(b) by 197 days.

(21) Appl. No.: 15/744,601

(22) PCT Filed: Dec. 23, 2015

(86) PCT No.: PCT/CN2015/098465
§ 371 (c)(1),
(2) Date: Jan. 12, 2018

(87) PCT Pub. No.: WO2017/008449
PCT Pub. Date: Jan. 19, 2017

(65) Prior Publication Data
US 2018/0212994 A1    Jul. 26, 2018

(30) Foreign Application Priority Data
Jul. 14, 2015 (CN) .......................... 2015 1 0413231

(51) Int. Cl.
*H04L 9/32* (2006.01)
*H04L 29/06* (2006.01)
(Continued)

(52) U.S. Cl.
CPC ...... *H04L 63/1483* (2013.01); *G06F 16/9535* (2019.01); *G06F 21/33* (2013.01);
(Continued)

(58) Field of Classification Search
USPC .......................................................... 713/171
See application file for complete search history.

(56) References Cited

U.S. PATENT DOCUMENTS

| 8,566,938 B1 * | 10/2013 | Prakash | .............. H04L 63/1483 726/22 |
| 2005/0268100 A1 * | 12/2005 | Gasparini | ........... H04L 63/0823 713/170 |

(Continued)

FOREIGN PATENT DOCUMENTS

| CN | 1835434 A | 9/2006 |
| CN | 1968091 A | 5/2007 |

(Continued)

OTHER PUBLICATIONS

International Search Report for PCT/CN2015/098465, dated Apr. 12, 2016, ISA/CN.
The Internet Society, RFC2821-SMTP, Apr. 2001.

*Primary Examiner* — Wasika Nipa
*Assistant Examiner* — Samuel Ambaye
(74) *Attorney, Agent, or Firm* — Yue (Robert) Xu; Apex Attorneys at Law, LLP

(57) ABSTRACT

An anti-phishing email system and an anti-phishing email method are provided. The system includes an email address registration and authentication subsystem configured to register an email address of a user, an email signature registration subsystem configured to register a signature generated by the user for information on a to-be-sent email, and an email signature query subsystem configured for an email receiving user to query whether the email is registered after the email receiving user receives the email, to determine whether the email is an illegal phishing email.

11 Claims, 2 Drawing Sheets

(51) Int. Cl.
*G06F 16/9535* (2019.01)
*G06Q 10/10* (2012.01)
*G06F 21/33* (2013.01)
*H04L 9/14* (2006.01)
*H04L 9/30* (2006.01)
*H04L 12/58* (2006.01)

(52) U.S. Cl.
CPC .............. *G06Q 10/107* (2013.01); *H04L 9/14* (2013.01); *H04L 9/30* (2013.01); *H04L 9/3247* (2013.01); *H04L 51/12* (2013.01); *H04L 63/0442* (2013.01); *H04L 63/08* (2013.01); *H04L 63/1416* (2013.01); *G06F 2221/2117* (2013.01)

(56) References Cited

U.S. PATENT DOCUMENTS

2008/0091947 A1\* 4/2008 Dancer ............... H04L 63/0442
  713/171
2009/0198997 A1\* 8/2009 Yeap ................... H04L 63/0823
  713/155
2010/0154055 A1  6/2010 Hansen

FOREIGN PATENT DOCUMENTS

| CN | 101123505 A | 2/2008 |
| CN | 101667979 A | 3/2010 |
| CN | 104994008 A | 10/2015 |

\* cited by examiner

| 4 digits (indicating a year) | 4 digits (indicating a month and a day) | 5 digits (indicating the 24 hours in seconds) | no more than 256 UNICODE characters (indicating an email address) | 8 to 32 ASCII characters (indicating a random number) |

E-MAIL ANTI-PHISHING SYSTEM AND METHOD

The present application is the national phase of International Patent Application No. PCT/CN2015/098465 filed on Dec. 23, 2015, which claims priority to Chinese Patent Application No. 201510413231.X, titled "E-MAIL ANTI-PHISHING SYSTEM AND METHOD", filed on Jul. 14, 2015 with the State Intellectual Property Office of People's Republic of China, both of which are incorporated herein by reference in their entireties.

FIELD

The present disclosure relates to the technical field of information security, and in particular to an anti-phishing email system and an anti-phishing email method.

BACKGROUND

Emails have been used for more than four decades and have become one of the major communication tools in everyday life and work. Hundreds of millions of emails are sent online every day. Although emails bring convenience to our work and life, they also give hackers opportunities to phish.

The standard of the domain keys identity email (DKIM) technology aims to solve the problem of fraudulent use of emails. With the DKIM, an enterprise can insert an encrypted signature into an email to be sent, where the signature is associated with a domain name. The signature is sent with the email, and an email receiver can verify, using the signature, that the email is really sent from the domain name. Since an impersonating email sending server usually do not add any DKIM information in emails, an email receiving server cannot know whether the email sender uses the DKIM technology. In the DKIM, public keys are assigned to domain names, rather than thousands of individual users under a domain name. Therefore DKIM authentication cannot be performed for an individual user. The DKIM technology has been deployed for more than eight years, but phishing emails are still prevalent on the internet. The problem of determining the credit of an identity of an email source is not essentially solved with the DKIM technology.

Specifically, at present the following problems (1) to (4) exist in sending an email:

(1) due to the security defects of the email technique protocol RFC2821, information on an email may be modified by an email sending server, an intermediate server or an email receiving server, resulting in prevalence of anonymous emails or phishing emails;

(2) the open domain name system DNS is fragile itself and is vulnerable to the domain name hijacking, so as to give attackers opportunities to replace a DKIM public key stored in the DNS, thus invalidating the DKIM system;

(3) the DKIM supports authentication based on a domain name instead of a whole email address, and a signature is controlled by a domain name manager rather than an individual email user, failing to provide a personalized service to the individual email user; and (4) the existing DKIM technology must be deployed on the email server side, resulting in a high deployment cost.

SUMMARY

In order to solve the problem of determining whether content and an address of an email are credible, an anti-phishing email system and an anti-phishing email method are provided according to the present disclosure. With the technique, it can be ensured that an email address shown in an email from a sender is really the address claimed by the sender, and content of the email from the sender is the content originally delivered by the sender without being modified by an intermediator. For example, it can be ensured that a Taobao's email does come from the Taobao, an email from the Industrial and Commercial Bank of China does come from the Industrial and Commercial Bank of China.

In order to implement the above object, the following technical solution is provided in the present disclosure.

An anti-phishing email system is provided, which includes:

an email address registration and authentication subsystem configured to register an email address of a user;

an email signature registration subsystem configured to register a signature generated by the user for information on a to-be-sent email;

an email signature query subsystem configured for an email receiving user to query whether the email is registered after the email receiving user receives the email, to determine whether the email is an illegal phishing email.

An anti-phishing email method using the above-described system is further provided, which includes the following steps:

(1) registering, by an email sending user, an email address used by the email sending user in the email registration and authentication subsystem;

(2) generating, by the email sending user, a signature for information on an to-be-sent email using an email signature generator; registering the generated signature in the email signature registration subsystem in a secure way; and after the email signature is registered successfully, sending the email to an email receiving user, wherein a field indicating whether the email signature is registered is added in an email header of the email; and (3) generating, after the email receiving user receives the email, a signature using a signature generator; querying the email signature query subsystem whether the email is registered; and determining whether the email is an illegal phishing email by comparing a query result with the information indicating whether the email signature is registered in the email header of the email.

Further, the email header in step (2) may include information of the following fields:

X-registered, which is a newly added field having a default value of "No" indicating that the information is not registered, and a value of "Yes" indicating that the information is registered successfully;

X-confirmation-No, which is a confirmation code assigned after the information on the email is registered successfully, including a field indicating a year, a field indicating a month and a day, a field indicating a time, a field indicating an email address, and a field indicating a random number.

Further, an input to the signature generator includes: an email sender which is an email address represented by no more than 256 UNICODE characters; an email receiver which is an email address represented by no more than 256 UNICODE characters; an email sending date which includes a year, a mouth and a day represented by 8 digital characters; and email content which is represented by UNICODE characters with an indefinite length. An output of the signature generator is an email signature represented by 128 ASCII characters.

Compared with the conventional technology, the advantageous effects of the present disclosure are as follows.

(1) With the anti-phishing email system of the present disclosure, the defects in security of the email technology protocol RFC2821 can be overcome. That is, modification to the core information on the email can be discovered timely and a phishing email personating the real sender can be identified timely.

(2) In the present disclosure, information of a secret key or signature is stored in a centralized controllable system rather than a distributed DNS. Registration, authentication and query can be made for information on each email sending user under the storage management.

(3) In the present disclosure, each individual email sending user can be provided with a personalized security service, and the email address can be associated with more credible information of the email sending user.

(4) In the present disclosure, deployment is not made on the email server side. Instead, the technique according to the present disclosure can be applied to an email client after a simple upgrade, thus greatly reducing the deployment cost.

DETAILED DESCRIPTION OF EMBODIMENTS

In order to make the foregoing objectives, features and advantages of the present disclosure clearer and more comprehensible, the present disclosure is further described with reference to the specific embodiments and the accompanying drawings.

Figures 1, 2:
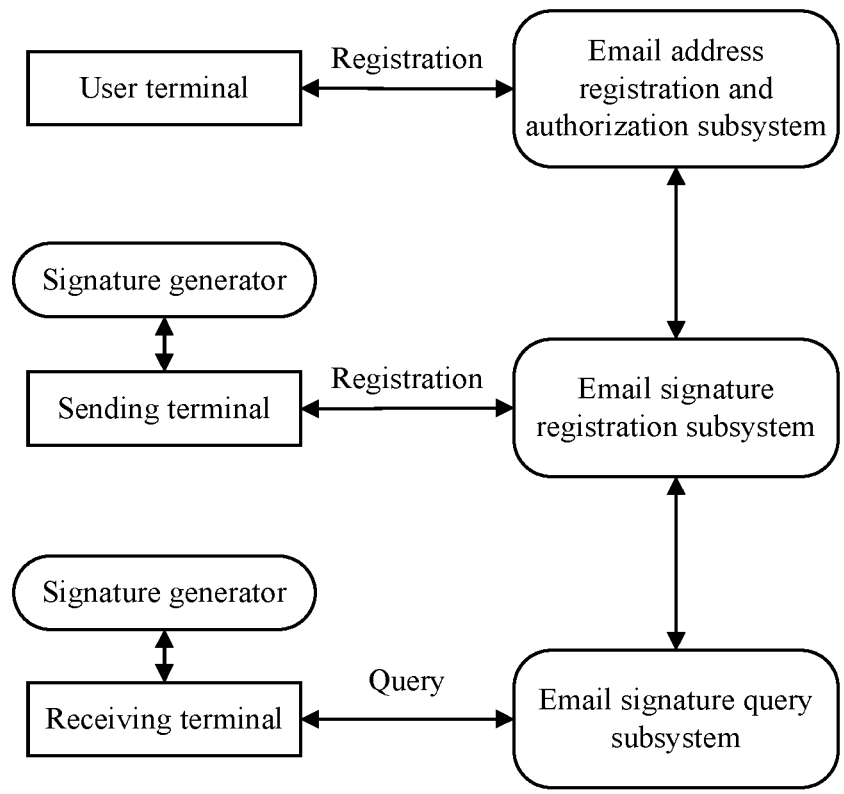
FIG. 1 is a schematic structural diagram of an anti-phishing email system according to the present disclosure.
FIG. 2 is a schematic diagram of a format of a confirmation code according to an embodiment.

An anti-phishing email mechanism based on registration and a system thereof are provided according to the present disclosure. As shown in FIG. 1, the anti-phishing email system mainly includes three parts, namely an email address registration and authentication subsystem, an email signature registration subsystem and an email signature query subsystem. In the present disclosure, the registration refers to a process that the email sending user registers, each time when sending an email, information on the email in the anti-phishing email system. The email is sent after the registration is successful. Then the email receiving user performs query and authentication after receiving the email.

Step One: Registration and Authentication of an Email Address

First, an email sending user registers an email address used by the email sending user in the email address registration and authentication subsystem using a user terminal and the email address is authenticated by the email address registration and authentication subsystem. The email address can be registered and authenticated by the following steps 1 to 5.

In step 1, the email sending user registers in the anti-phishing email system to be a user, and submits an email address to the email address registration and authentication subsystem.

In step 2, the email address registration and authentication subsystem sends a registration confirmation code and a link to the email address.

In step 3, the email sending user records information on the email address using the registration confirmation code and the link received by the email address.

In step 4, the email address registration and authentication subsystem confirms the registration information on the email address, and sends information indicating that the email address is registered successfully to the email sending user.

In step 5, the email address registration and authentication subsystem periodically send user information registered with the email address to the registered email address, to prompt the user to modify the user information or unbind the user if the information is incorrect.

Step Two: Registration and Sending of an Email

An email sending user generates an email signature for information on the to-be-sent email using the signature generator. The email sending user may register the signature for the information in the email signature registration subsystem in a secure way. In the registration of the email signature, the email signature may be encrypted with a private key in key pair information registered in the anti-phishing email system (a separate storage module may be provided in the anti-phishing email system for storing the key pair information). The encrypted information is sent by the following steps 1 to 4.

In step 1, the email sending user sends the encrypted signature and information of the sender, the receiver and the sending date to the anti-phishing email system using the email address in the signature. Alternatively, the signature and the information of the sender, the receiver and the sending date can be directly added in the anti-phishing email system by the email sending user after the email sending user logs into the system.

In step 2, after the email signature registration subsystem of the anti-phishing email system receives the encrypted signature, the email signature registration subsystem decrypts the encrypted signature using a public key stored in the system by the email sending user, and stores the signature information in the anti-phishing email system.

In step 3, if the information of the sender, the receiver and the sending date of an email and the signature information are stored successfully and the signature information is checked as correct, the registration is successful. The anti-phishing email system confirms to the email sending user that the email signature is registered successfully and sends a confirmation code to the email sending user. The confirmation code may or may not be encrypted. It is generally suggested that the confirmation code is encrypted for security.

In step 4, after the email sending user receives the confirmation code and the information that the email signature is registered successfully, the email sending user sends the email to the email receiving user using a sending terminal. The signature may also be checked directly by the email sending user after the email sending user logs into the system. The information in the email header contains information of the following fields:

X-registered: Yes
X-confirmation-No:
    2015042286400ABC@example.comWetResZx

The X-registered is a field newly added in the email header. The default value of the field is "No" which indicates that the information is not registered. If the information is registered successfully, the value of the field is "Yes". The newly added X-confirmation-No is the confirmation code assigned to the successfully registered email information by the anti-phishing email system. The fields X-registered and X-confirmation-No may also be named otherwise.

FIG. 2 shows a format of the confirmation code which includes a field indicating a year, a field indicating a month and a day, a field indicating a time, a field indicating an email address, and a field indicating a random number.

Step 3: Reception and Verification of an Email

After the email receiving user receives the email, the email receiving user checks information in the email header by a receiving terminal and finds that the received email is a registered email. The email receiving user generates a signature by the signature generator using the information of the sender, the receiver, the sending date, and email content of the received email. After the email receiving user submits the information of the sender, the receiver, the sending date, the confirmation code and the signature information to the email signature query subsystem, the email signature query subsystem presents to the user whether the email is registered (i.e., whether the email is recorded) and whether the core information is modified if the email is registered. If it is confirmed that the email is registered, while it is prompted by the system that the registration information is incorrect, the email receiving user is prompted that the email may be an illegal phishing email, thus avoiding unnecessary loss.

The email sending user may also notify the email receiving user, by a short message, telephone or the like, that an email is a registered email and that the receiver can query a specific anti-phishing email system. If the email receiving user finds an error by querying, it is indicated that the received email is an illegal phishing email.

Figure 3:
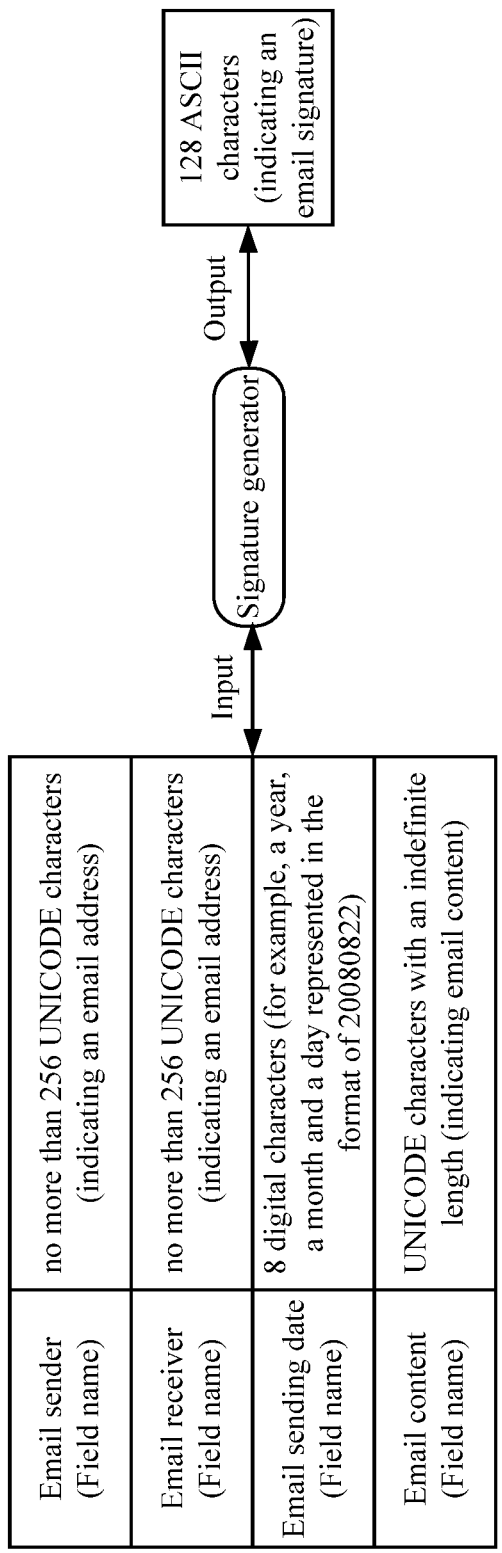
FIG. 3 is a schematic diagram of an input and an output of a signature generator according to an embodiment.

In the present disclosure, the signature generator generates a signature by using specific information on the email. The input and output information is shown in FIG. 3. The input includes: an email sender which is an email address represented by no more than 256 UNICODE characters, an email receiver which is an email address represented by no more than 256 UNICODE characters, an email sending date which is the information of year/month/day represented by 8 digital characters, and the email content which is represented by UNICODE characters with an indefinite length. The output of the signature generator is an email signature represented by 128 ASCII characters.

A specific application example is provided below, which includes the following steps (1) to (8).

In step (1), a user Zhang San registers in the email address registration and authentication subsystem by a user terminal with a user name of zhangsan and a password of "example-pass", then registers an email address of ABC@example.com under the user name. The system sends the following confirmation code and a link to the email address:

https://mm.emailregistercenter.org.cn/mailman/confirm/
ua-international/
eeb15e1270c0ca233e6007_3250c8ad2531a07dfa the confirmation code is eeb15e1270c0ca233e60073250c8ad2531a07dfa Zhang San records information on the email address in the email address registration and authentication subsystem using the confirmation code and the link received by the email box.

In step (2), the user Zhang San clicks on the link after logging into the email box to confirm the registration. The email address registration and authentication subsystem confirms the registration information on the email address and sends the information that the email address is registered successfully to Zhang San. The user Zhang San may also choose to display other system-verified information through the address, such as information of a company name, an address or other card information of the sender. The user Zhang San may also obtain information of the public key of a key pair from the system or submit the information to the system in advance.

In step (3), the email address registration and authentication subsystem periodically sends user information registered with the email address to the registered email address to prompt the user Zhang San to modify the information or unbind the user in time if the information is incorrect.

In step (4), the user Zhang San generates a signature using the signature generator, and sends the encrypted email signature and information of the sender, the receiver and the sending date to the anti-phishing email system using the email address in the signature. Alternatively, the user Zhang San may directly log into the system and add the email signature and the information of the sender, the receiver and the sending date.

In step (5), after receiving the encrypted email signature, the email signature registration subsystem of the anti-phishing email system decrypts the encrypted email signature using a public key stored in the system by the user, and stores signature information in the anti-phishing email system.

In step (6), if the information of the sender, the receiver and the sending date and the signature information of the email are stored successfully and the signature information is is checked as correct, the registration is successful. The anti-phishing email system confirms to the user that the email signature is registered successfully and sends a signature confirmation code encrypted with the user's public key to the user.

In step (7), after receiving the confirmation code and the information that the email signature is registered successfully, the email sending user sends the email to the email receiver using the sending terminal. The email header contains information of the following fields:

X-registered: Yes
X-confirmation-No:
2015042286400ABC@example.comWetResZx

The X-registered is a field newly added in the email header. If the registration is successful, the value is "Yes". X-confirmation-No is the confirmation code which is assigned to the successfully registered information on the email by the anti-phishing email system.

A specific example of an email header is as follows:
Received: from unknown218.241.118.6 (HELO ironportc370 m.example.com) (218.241.118.6) by 218.241.118.7 with SMTP; Wed, 29 May 2013 11:18:20+0800
X-IronPort-Anti-Spam-Filtered: true
X-IronPort-AV: E=Sophos;i="4.87,762,1363104000";
d="scan'208",a="7425305"
X-registered: Yes
X-confirmation-No:
2015042286400ABC@example.comWetResZx
Received: from mail-b121p0208,outbound.protection.outlook.com (HELO
na01-b12-obe.outbound.protection.outlook.com)
([207.46.163.208]) by ironportc370 m.cnnic.en with ESMTP; 29 May 2013 11:18:17+0800
Received: from mail210-ch1 (localhost [127.0.0.1]) by
From: Zhang San <ABC@example.com>
To: Kim<test@nic.kr>
Subject: TEST In step (8), after receiving the email, the email receiver checks information in the email header by the receiving terminal and finds that the received email is a registered email. The email receiver generates a signature by the signature generator using information on the received email. After the user submits the information of the sender, the receiver, the sending date, the confirmation code and the signature information to the email signature query subsystem, the email signature query subsystem presents to the user whether the email is registered. If the submitted information is correct, while it is prompted by the system that the registration information is not exist, the email receiver is prompted that the email may be an illegal phishing email, thus avoiding unnecessary loss. Specifically, the following three results may be obtained.

(a) If the email header shows that the email is a registered email and the email signature query subsystem shows to the user that the signature information is correct, it is proved that the receiver receives an original email without any change, that is, the email content and information on the receiver and the sender are correct.

(b) If the email header shows that the email is a registered email, while the email signature query subsystem shows to the user that the signature information is incorrect, it is proved that the receiver receives a modified email and special precautions should be taken in handling the email.

(c) If the email header shows that the email is not a registered email, while the email sender notifies the email receiver that the email is a registered email in another way, it is proved that the receiver receives a phishing email and special precautions should be taken in handling the email.

For example, an email sender pretends to be the Industrial and Commercial Bank of China and sends information on electronic password modification to an email receiving user by an email address of webmaster@icbc.com.cn, to deceive the customer entering information on an account in the Industrial and Commercial Bank of China. It seems just from the email address that webmaster@icbc.com.cn is indeed the email address of the Industrial and Commercial Bank of China. The sender of the email forges the address and content of the mail from the ICBC using defects of the email protocol SMTP, and sends the information to the terminal user. If the terminal user cannot identify and be alert against such email in a certain way, the account may be hacked and the saving may be stolen.

If the ICBC registers the email address of webmaster@icbc.com.cn in the anti-phishing email system according to the present disclosure, and registers the email in the system, an email receiving user can easily determine whether the email is a phishing email by querying the system, thus avoiding possible significant economic loss.

The above embodiments are merely intended for describing the technical solutions of the present disclosure instead of limiting the present disclosure. Those skilled in the art can make modifications or equivalents to the technical solutions of the present disclosure without departing from the spirit and scope of the present disclosure. The protection scope of the present disclosure is defined by the claims.

The invention claimed is:

1. An anti-phishing email method using an anti-phishing email system, the anti-phishing email system comprises an email address registration and authentication subsystem, an email signature registration subsystem and an email signature query subsystem, wherein the anti-phishing email method the method comprises:
   (1) registering, by an email sending user, an email address used by the email sending user in the email address registration and authentication subsystem;
   (2) generating, by the email sending user, a signature for information on a to-be-sent email using an email signature generator; registering the generated signature in the email signature registration subsystem in a secure way; and after the email signature is registered successfully, sending the email to an email receiving user, wherein a field indicating whether the email signature is registered is added in an email header of the email; and
   (3) generating, after the email receiving user receives the email, a signature using a signature generator; querying the email signature query subsystem whether the email is registered; and determining whether the email is an illegal phishing email by comparing a query result with the information indicating whether the email signature is registered in the email header of the email,
   wherein
   an input to the signature generator comprises:
      an email sender which is an email address represented by no more than 256 UNICODE characters;
      an email receiver which is an email address represented by no more than 256 UNICODE characters;
      an email sending date comprising a year, a mouth and a day represented by 8 digital characters; and
      email content represented by UNICODE characters with an indefinite length; and
   an output of the signature generator is an email signature represented by 128 ASCII characters.

2. The method according to claim 1, wherein the step (1) comprises:
   (1-1) registering, by the email sending user, in the anti-phishing email system to be a user and submitting an email address to the email address registration and authentication subsystem;
   (1-2) sending, by the email address registration and authentication subsystem, a registration confirmation code and a link to the email address;
   (1-3) recording, by the email sending user, information on the email address using the registration confirmation code and the link received by the email address;
   (1-4) confirming, by the email address registration and authentication subsystem, registration information on the email address and sending information indicating that the email address is registered successfully to the email sending user; and
   (1-5) periodically sending, by the email address registration and authentication subsystem, user information registered with the email address to the registered email address, to prompt the user to modify the user information or unbind the user if the information is incorrect.

3. The method according to claim 1, wherein the registering the generated signature in the email signature registration subsystem in a secure way in step (2) comprises:
   (2-1) encrypting, by the email sending user, the signature using a private key in key pair information registered in the anti-phishing email system;
   (2-2) decrypting, by the email signature registration subsystem after receiving the encrypted signature, the encrypted signature using a public key stored in the anti-phishing email system by the email sending user and storing the signature information; and
   (2-3) confirming, to the user by the anti-phishing email system, that the email signature is registered successfully and sending a confirmation code to the email sending user.

4. The method according to claim 3, wherein the email header in the step (2) comprises information of the following fields:

X-registered, which is a newly added field having a default value of "No" indicating that the information is not registered, and a value of "Yes" indicating that the information is registered successfully; and X-confirmation-No, which is a confirmation code assigned after the information on the email is registered successfully, comprising a field indicating a year, a field indicating a month and a day, a field indicating a time, a field indicating an email address, and a field indicating a random number.

5. The method according to claim 1, wherein the step (3) comprises:
presenting, by the email signature query subsystem, to the email receiving user whether the email is registered, after the email receiving user submits the information on the sender, the receiver, the sending date, the confirmation code and the signature information to the email signature query subsystem; and
prompting the email receiving user that the email is an illegal phishing email in a case where it is confirmed that the email is registered while the registration information is incorrect.

6. The method according to claim 1, comprising:
determining the received email is an illegal phishing email in a case where the email sending user notifies the email receiving user, by a short message or by telephone, that an email is a registered email, while the email receiving user finds an error after querying the anti-phishing email system.

7. The method according to claim 2, wherein the registering the generated signature in the email signature registration subsystem in a secure way in step (2) comprises:
(2-1) encrypting, by the email sending user, the signature using a private key in key pair information registered in the anti-phishing email system;
(2-2) decrypting, by the email signature registration subsystem after receiving the encrypted signature, the encrypted signature using a public key stored in the anti-phishing email system by the email sending user and storing the signature information; and
(2-3) confirming, to the user by the anti-phishing email system, that the email signature is registered successfully and sending a confirmation code to the email sending user.

8. The method according to claim 7, wherein the email header in the step (2) comprises information of the following fields:
X-registered, which is a newly added field having a default value of "No" indicating that the information is not registered, and a value of "Yes" indicating that the information is registered successfully; and
X-confirmation-No, which is a confirmation code assigned after the information on the email is registered successfully, comprising a field indicating a year, a field indicating a month and a day, a field indicating a time, a field indicating an email address, and a field indicating a random number.

9. An anti-phishing email system for implementing an anti-phishing email method, the anti-phishing email method comprises (1) registering, by a user terminal used by an email sending user, an email address used by the email sending user in an email address registration and authentication subsystem; (2) generating, by a sending terminal used by the email sending user, a signature for information on a to-be-sent email using an email signature generator; registering the generated signature in an email signature registration subsystem in a secure way; and after the email signature is registered successfully, sending the email to an email receiving user, wherein a field indicating whether the email signature is registered is added in an email header of the email; and (3) generating, by a receiving terminal after the email receiving user receives the email, a signature using a signature generator; querying an email signature query subsystem whether the email is registered; and determining whether the email is an illegal phishing email by comparing a query result with the information indicating whether the email signature is registered in the email header of the email, wherein an input to the signature generator comprises: an email sender which is an email address represented by no more than 256 UNICODE characters; an email sending date comprising a year, a mouth and a day represented by 8 digital characters; and email content represented by UNICODE characters with an indefinite length; and an output of the signature generator is an email signature represented by 128 ASCII characters,
wherein the anti-phishing email system comprises: a memory, and a processor, wherein the processor comprises an email address registration and authentication subsystem, an email signature registration subsystem, and an email signature query subsystem, wherein,
the memory is configured to store a program;
the processor is configured to execute the program, and when the program is being executed, the email address registration and authentication subsystem is configured to receive the email address used by the email sending user and register the email address;
the email signature registration subsystem is configured to register the signature generated by the email sending user using the email signature generator for the information on the to-be-sent email; and
the email signature query subsystem is configured for the email receiving user to query whether the email is registered after the email receiving user receives the email, to determine whether the email is an illegal phishing email.

10. The system according to claim 9, wherein the email address registration and authentication subsystem is configured to, after the user submits the email address to the email address registration and authentication subsystem,
send a registration confirmation code and a link to the email address for the user to record information on the email address using the registration confirmation code and the link; and
confirm registration information on the email address and send information that the email address is registered successfully to the user.

11. The system according to claim 9, further comprising a storage module configured to store key pair information, wherein
a private key in the key pair information is used by the user to encrypt the signature, and
a public key of the key pair is used by the email signature registration subsystem to decrypts the encrypted signature after the email signature registration subsystem receives the encrypted signature.

* * * * *